United States Patent [19]

Chasseguet et al.

[11] Patent Number: 4,838,395

[45] Date of Patent: Jun. 13, 1989

[54] TORSION DAMPING DEVICE

[75] Inventors: Gustave Chasseguet, Taverny; Jacky Naudin; Pierre Casse, both of Ermont, all of France

[73] Assignee: Valeo, Paris, France

[21] Appl. No.: 241,258

[22] Filed: Sep. 7, 1988

[30] Foreign Application Priority Data

Sep. 10, 1987 [FR] France .............................. 87 12546

[51] Int. Cl.[4] .............................................. F16F 15/12
[52] U.S. Cl. .................................... 188/378; 74/574; 192/106.2; 267/166; 267/273; 464/66
[58] Field of Search ................... 188/378, 379, 380; 267/273, 275, 277, 279, 281, 33, 166, 167; 464/66, 68, 67, 62, 64; 74/574; 192/106.2

[56] References Cited

U.S. PATENT DOCUMENTS 4,160,390 7/1979 Spaetgens ................. 188/378 X
4,698,045 10/1987 Billet et al. ............... 192/106.2 X
4,747,801 5/1988 Chasseguet et al. ........... 74/574 X
4,748,868 6/1988 Kobayashi et al. ............ 74/574
4,767,380 8/1988 Chasseguet et al. ........... 74/574 X

*Primary Examiner*—Douglas C. Butler
*Attorney, Agent, or Firm*—Charles E. Brown; Charles A. Brown

[57] ABSTRACT

An improvement to a torsion damping device, especially a double damped flywheel, for eliminating contact between the springs and one of the rotatable parts of the device when the springs tend to deform under the effect of centrifugal force. According to the invention, the springs, which are conventionally mounted between two pivoted thrust members, are each replaced by a damping device comprising two springs with a central insert between them, the insert being so shaped as to make contact with the inner surface of the spacing ring. The invention is applicable to an automobile transmission.

6 Claims, 1 Drawing Sheet

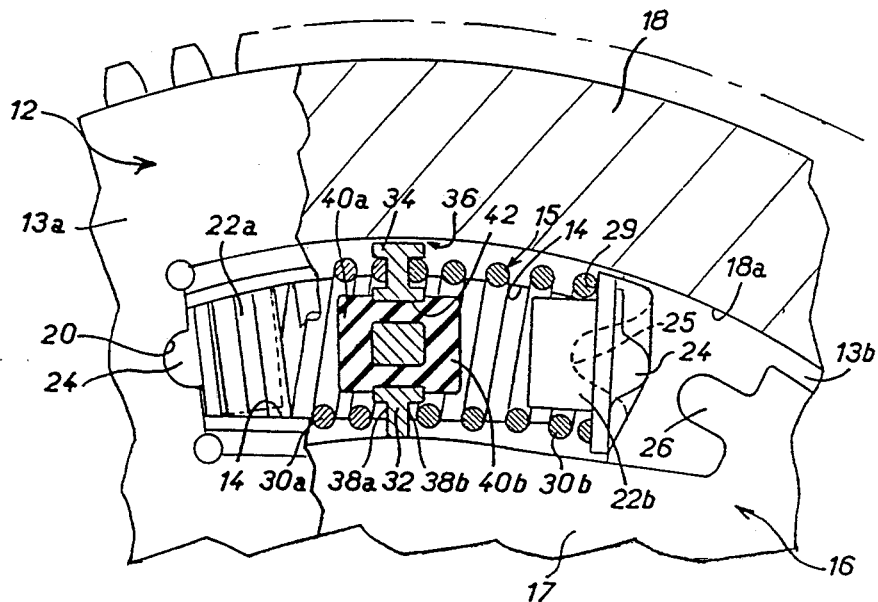

4,838,395

TORSION DAMPING DEVICE

FIELD OF THE INVENTION

This invention relates to a torsion damping device for a torque transmission, especially for an automotive vehicle, the device being of the kind comprising two coaxial rotating parts which are mounted for relative angular displacement with respect to each other, with coil springs being machanically interposed between the two parts. The invention is more particularly directed to an improvement designed to overcome the problem presented by deformation of the springs under centrifugal force, when they make contact with certain zones of one of the coaxial parts.

BACKGROUND OF THE INVENTION

By way of example, French Patent No. 2 571 461 describes one arrangement of torsion damping device of the kind commonly referred to as a double damped flywheel. Circumferentially acting coil springs are arranged between the two rotatable parts so as to be compressed when the angular displacements take place. The two rotatable parts comprise a power input part, normally driven, for example from the vehicle engine, and comprising essentially two parallel annular wheel members which are secured together radially outwardly thereof by a heavy spacer ring. The other of the said rotatable parts is a power output part, driven by the power input part and including at least one radial plate which is arranged to rotate in its own plane between the two wheel members of the power input part. Each spring is mounted between two thrust members made of a rigid plastics material, these thrust members being pivoted in rounded notches formed in the wheel members of the power input part. Two of such thrust members thus lie facing each other in the space defined by two through openings formed respectively in the two wheel members, with a spring being mounted between these thrust members. The thrust members have cavities formed in their end surfaces facing away from the spring; and fingers, extending substantially circumferentially and formed in the radial plate or plates of the power output part, engage in the cavities formed in the thrust members.

Under the effect of centrifugal force, the springs make frictional contact with the inner surface of the spacer ring. This frictional contact is accentuated by virtue of the positioning of the springs at a relatively large radius from the axis of rotation, and also because of the action of the pivoting thrust members in allowing the springs to deform with increased amplitude. The inner surface of the spacer ring thus defines contact zones for the springs. It is found that deterioration occurs in these contact zones. This can take the form of any of the following, namely fretting, partial penetration or "coining" of the contact zones by the turns of the spring, and excessive wear in certain parts of the springs. The springs can thus be progressively weakened, resulting eventually in broken springs.

SUMMARY OF THE INVENTION

An object of the invention is to eliminate the above mentioned disadvantages.

To this end, the invention provides a torsion damping device of the above kind, which is characterised in that, between two said thrust members disposed circumferentially in facing relationship, there is interposed a damping means comprising two springs and an insert between the two springs, with each said spring bearing at one end thereof against a respective one of said thrust members and the other end bearing agains the said insert, and the device being further characterised in that the insert is so shaped that, when the damping means tends to deform under the action of centrifugal force, contact with the contact zone of the rotatable part is made by the insert rather than by the remainder of the damping means.

According to the invention, each spring in the prior art arrangement is thus replaced by a pair of shorter springs which are located on either side of the insert. It is this insert which makes frictional contact with the contact zone. Wear is concentrated on the insert instead of the spring, so that the insert is preferably formed in a material adapted to resist wear, for example a moulded plastics material of the polyamide type. All contact between the spacer ring and the turns of the springs is thus avoided.

The insert is so dimensioned as to reduce wear: for example it may have a shape conforming with the contact zones of the spacer ring. In a modification, the insert may have at least one roller, whereby frictional contact is replaced by rolling contact.

The invention will be better understood in the light of the description which follows, which is given by way of example and without limitation, and with reference to the attached drawing.

BRIEF DESCRIPTION OF THE DRAWING

The single Figure of the drawing is a scrap view, partly cut away, of a double damped flywheel showing only a region of the latter which includes damping means according to the invention.

DESCRIPTION OF A PREFERRED EMBODIMENT

The drawing shows a double damped flywheel of the kind described in the published French Patent Specification No. 2 571 461 (except for the springs, which are modified in accordance with the present invention). Only those parts necessary to an understanding of the invention are shown. The device includes a power input part 12 comprising two wheel members 13a and 13b in which through openings 14 are formed. Damping means 15, comprising coil springs extending substantially circumferentially, are mounted in the through openings 14. The device further includes a power output part 16 comprising radial plates, of which only one, namely a plate 17, is shown in the Figure. Conventionally, the two wheel members 13a and 13b, which are parallel to each other, are joined radially outwardly by a heavy ring 18 which constitutes a spacer. Each damping means has two of the through openings 14, similar to each other and formed in alignment with each other in the two respective wheel members 13a and 13b. Each of these through openings has a rounded notch 20 which is formed in each of its substantial radial terminal edges. The notches 20 of the respective wheel members 13a and 13b are in correspondence with one another, so as to allow a thrust member 22a or 22b respectively to be pivoted therein. Each thrust member 22a, 22b is made of relatively rigid moulded plastics material as described in published French Patent Specification No. 2 571 461, and includes two nose portions 24 which cooperate with the notches 20 in such a way as to allow the respective thrust member to pivot radially outwardly. Each thrust member also has a cavity 25, which is open between the two nose portions and is so shaped as to cooperate with a finger 26, which extends approximately circumferentially and which is formed integrally with the radial plate 17. Each thrust member includes a shoulder 29, on which one end of the springs 30a and 30b of the damping means 15 makes abutting engagement.

In accordance with the invention, each damping means includes, besides the two springs 30a and 30b, and insert 32 in the central portion of the spring. Each spring bears at one end on a respective one of the thrust members 22a and 22b, and at the other end on a face of the insert 32. The latter includes a contact projection 34 extending, radially outwardly of the insert, so as to face towards the inner surface 18a of the ring 18. This inner surface 18a provides contact zones for the inserts. An initial clearance 36 (which exists when the device is in its rest condition) is formed between the said contact projection 34 and the inner surface 18a. Each end face of the insert has a respective annular shoulder 38a, 38b, the dimensions of which correspond with those of the turns of the two springs. The end of each corresponding spring bears against the respective one of these shoulders.

The shape of the insert 32 may be designed with a view to reducing wear: the outer surface of its contact projection 34 is preferably so shaped as to conform with the profile of the inner surface 18a of the ring 18. In a modification, the projection 34 includes a roller, such that frictional contact is replaced by rolling contact.

Another beneficial feature of the invention consists in the provision of projections 40a and 40b, of elastomeric or similar material and projecting from each of the end faces of the insert 32 within the internal space surrounded by the turns of the corresponding spring. It should be noted that these projections, the purpose of which is to limit compression of the springs during large angular displacements between the coaxial parts 12 and 16, have in the past commonly been bonded to the ends of the thrust members 22. In the present case, it is advantageous that the insert 32 be provided with holes 42 extending through it in such a way that the two stop portions of elastomeric material are integral with each other, so as to constitute a single member which is moulded into the insert 32 so as to fill these holes. The operation of moulding this member into the insert is both preferable and easier to carry out than the adhesive bonding of stop portions on to the thrust members.

The present invention is however not limited to the embodiments described. In particular, as indicated in published French Patent Application No. 87 09919, filed on 15th July 1987, the wheel members may be joined together outside the springs so as to enclose them, with the assembly of these two wheel members including an inertia plate in such a way that the insert may make contact with at least one external extension of one of the wheel members, the latter being of the general type indicated at 42 or 142a, 142b in the above mentioned French Patent Application. It is these generally axial extensions which incorporate the contact zones for the inserts.

Finally, the insert and described in published French Patent Application No. 87 09921, filed 15th July 1987, may make contact with the outer edge of a through opening of an annular radial plate or wheel member fixed to an inertia plate and engaged between the two radial plates constituting guide rings of a torque limiter. In this case, the contact zones for the inserts are constituted by the radially outermost edges of the through openings, that is to say by the rotatable part which is distinct from that which carries the wheel members on which the springs are pivoted.

What is claimed is:

1. A torsion damping device of the kind comprising two coaxial rotatable parts mounted for relative angular displacement with respect to each other, with circumferentially acting coil springs interposed between them, said springs being mounted in one of said rotatable parts between thrust members pivoted to the latter, while at least one radial plate of the other of said rotatable parts is adapted to cooperate with said thrust members, one of the said rotatable parts defining contact zones towards which the springs tend to deform under the effect of centrifugal force, wherein between two said thrust members disposed circumferentially in facing relationship, there is interposed a damping means comprising two springs and an insert between the two said springs, with each said spring bearing at one end thereof against a respective one of said thrust members and the other end bearing against the said insert, said insert being so shaped that, when the damping means tends to deform under the action of centrifugal force, contact with the said contact zone of the said rotatable part is made by the insert rather than by the remainder of the damping means.

2. A device according to claim 1, wherein said insert includes a contact projection extending outwardly so as to face towards the said contact zone.

3. A device according to claim 2, wherein an initial clearance is provided between said contact projection and said contact zone.

4. A device according to claim 1, wherein each end face of said insert includes a shoulder on which the appropriate end of the corresponding spring bears.

5. A device according to claim 1, wherein stop portions of elastomeric or similar material project from each end face of said insert, in the space surrounded by the turns of the corresponding spring.

6. A device according to claim 5, wherein said insert has through holes, said stop portions of elastomeric material being integral with each other to form a single member moulded onto said insert and filling said holes.

* * * * *